United States Patent
Lee et al.

(10) Patent No.: US 7,762,093 B2
(45) Date of Patent: Jul. 27, 2010

(54) METHOD FOR CONTROLLING VARIABLE CAPACITY COMPRESSOR OF AIR CONDITIONER

(75) Inventors: Jeong-Hoon Lee, Daejeon-si (KR); Young-Kil Kim, Daejeon-si (KR); Tae-Eun Kim, Daejeon-si (KR)

(73) Assignee: Halla Climate Control Corp., Daejeon-si (KR)

( * ) Notice: Subject to any disclaimer, the term of this patent is extended or adjusted under 35 U.S.C. 154(b) by 964 days.

(21) Appl. No.: 11/539,367

(22) Filed: Oct. 6, 2006

(65) Prior Publication Data

US 2007/0079621 A1 Apr. 12, 2007

(30) Foreign Application Priority Data

Oct. 7, 2005 (KR) ............ 10-2005-0094287

(51) Int. Cl.
*F25B 41/00* (2006.01)
*F25B 49/00* (2006.01)

(52) U.S. Cl. .................. 62/209; 62/228.1; 62/229; 236/91 C

(58) Field of Classification Search ............... 62/208, 62/209, 229, 228.1; 236/91 C
See application file for complete search history.

(56) References Cited

U.S. PATENT DOCUMENTS

2004/0089004 A1* 5/2004 Ogiso et al. ............ 62/203

2006/0185375 A1* 8/2006 Nadamoto et al. ......... 62/228.1

FOREIGN PATENT DOCUMENTS

| JP | 2001-153425 | 6/2001 |
|----|-------------|--------|
| JP | 2001-227825 | 8/2001 |
| JP | 2001-227826 | 8/2001 |
| JP | 2003-200730 | 7/2003 |
| WO | 2005/021300 A1 | 3/2005 |

* cited by examiner

*Primary Examiner*—Marc E Norman
(74) *Attorney, Agent, or Firm*—Lowe Hauptman Ham & Berner LLP

(57) ABSTRACT

A variable capacity air conditioner compressor is controlled by setting a car target indoor temperature; sensing car indoor and outdoor temperatures and solar radiation with sensors at predetermined car positions; calculating a vent target discharge temperature using the target temperature, sensed car temperatures and solar radiation; calculating a target evaporator temperature and blower voltage based on target discharge temperature; calculating a control duty based on the target evaporator temperature; calculating target evaporator temperature and blower voltage change rates; determining whether or not the compressor conies under a sudden variable condition based on the control duty, and target evaporator temperature and blower voltage change rates; and setting a control duty change rate maximum value to an accelerative slew rate greater than and equal to a basic slew rate when sudden and not sudden variable conditions are respectively determined.

7 Claims, 6 Drawing Sheets

PRIOR ART

PRIOR ART

METHOD FOR CONTROLLING VARIABLE CAPACITY COMPRESSOR OF AIR CONDITIONER

RELATED APPLICATION

The present application is based on, and claims priority from, Korea Application Number 10-2005-0094287, filed Oct. 7, 2005, the disclosure of which is hereby incorporated by reference herein in its entirety.

BACKGROUND OF THE INVENTION

1. Field of the Invention

The present invention relates to a method for controlling a variable capacity compressor of an air conditioner, and more particularly, to a method for controlling a variable capacity compressor of an air conditioner, which can improve convergence and response properties of temperature by changing a control duty change rate, namely, the maximum value in a slew rate, according to a size of the control duty or a change in an air conditioning environment.

2. Background Art

In general, a variable capacity compressor for an air conditioner uses a pressure control valve to adjust a refrigerant discharge volume, but may adopt an ECV (Electronic Control Valve) using electric power instead of the pressure control valve of a mechanical structure. A variable capacity compressor adopting the ECV determines the refrigerant discharge volume of the compressor according to an inclination of a swash plate since the inclination of the swash plate is changed by the duty of the ECV. So, a refrigerant volume supplied to an evaporator is changed according to the duty of the ECV, and it means that the duty of the ECV is the main factor to determine evaporator temperature. The duty of the ECV is a value to indicate a time period, while the ECV is turned on, into percentage. Therefore, the refrigerant discharge volume of the compressor by time is increased when the duty is high, but is decreased when the duty is low.

As shown in FIG. 1, the air conditioner adopting the variable capacity compressor generally includes: an air conditioning case 210; an blower 220 mounted on an inlet side of the air conditioning case 210; an evaporator 200 mounted inside the air conditioning case 210 for cooling air using refrigerant discharged from a compressor 100; a heater core 230 mounted inside the air conditioning case 210 for receiving cooling water heated by an engine (E); a temperature control door 240 for controlling an opening and closing level of a cold air passageway and a hot air passageway of air passing through the evaporator 200; the compressor 100 for compressing and discharging refrigerant returned from the evaporator 200; a condenser 170 for condensing and discharging refrigerant supplied from the compressor 100; a receiver dryer 180 for gas-liquid separating refrigerant supplied from the condenser 170; and an expansion valve 190 for throttling refrigerant supplied from the receiver dryer 180 and sending it to the evaporator 200.

In the drawing, the unexplained reference numerals 212, 214 and 216 designate vents, and 212d, 214d and 216d designate doors for controlling the opening and closing amount of each of the vents 212, 214 and 216.

Meanwhile, a control unit 300 controls driving output of devices such as an electromagnetic clutch 146 for intermittently transmitting driving power of the engine (E) to the compressor 100, an ECV 160 for controlling a discharge volume of the compressor 100 by adjusting an inclination angle of the swash plate 144, and an actuator 310 for controlling the opening and closing level of the temperature control door 240. That is, the control unit 300 applies or interrupts electricity to or from the electromagnetic clutch 146, controls output voltage to the actuator 310 in such a way that the temperature control door 240 turns round toward a flow channel directing to the heater core 230 or a flow channel going round the heater core 230, and controls the duty of the ECV 160, namely, a time period while the ECV 160 is turned on, to increase and decrease the discharge volume of the compressor 100 by changing the inclination angle of the swash plate 144 against a driving shaft.

The unexplained reference numeral 320 designates an evaporator temperature sensor, 330 designates an outdoor temperature sensor, 340 designates an indoor temperature sensor, 350 designates a solar radiation sensor, 360 designates a cooling water temperature sensor. Sensing signals sensed by the above sensors are inputted to the control unit 300, and temperature set by a user, blower voltage, and so on are inputted to the control unit 300.

A target evaporator temperature is calculated by the set temperature of a car inputted by the user, the indoor temperature, the outdoor temperature and a solar radiation sensed and inputted from the sensors 330, 340 and 350 mounted at predetermined positions of the car. When the target evaporator temperature is calculated, a target duty of the ECV is calculated by evaporator temperature measured by the evaporator temperature sensor 320 and the target evaporator temperature.

When the target duty is calculated, the duty is changed from the current duty to the target duty by a predetermined slew rate, and in this instance, the slew rate is set not to exceed a basic slew rate (S0). Here, the slew rate means a change rate of the duty.

The basic slew rate (S0) is determined as a value to prevent hunting of the compressor, namely, a bump generated due to a sudden change of an introduced refrigerant volume of the compressor, and to minimize a pulsation of a refrigerant flow even though the introduced refrigerant volume of the compressor is changed.

According to a conventional compressor controlling method, the target duty is calculated by using the real evaporator temperature measured by the evaporator temperature sensor, the duty controlling the ECV, and the target evaporator temperature as a variable, and the calculated duty controls the ECV of the compressor. After the control of the ECV, the evaporator temperature is measured again, and the above process for calculating the target duty is repeated.

Even though the user suddenly manipulates a blower switch or changes the set temperature, the conventional compressor controlling method is deteriorated in convergence and response properties of the evaporator temperature since the duty change rate does not exceed the basic slew rate.

In other words, the conventional compressor controlling method controls in such a way that the duty change rate of the ECV 160, namely, the slew rate, cannot exceed the basic slew rate (S0) without regard to changes of the outside conditions. So, since the ECV duty is changed slowly even though the environment is suddenly changed, there occurs excessive overshoot or undershoot in evaporator temperature till the duty reaches the target duty, and thereby, it takes much time that the evaporator temperature reaches a stabilized state. Therefore, the conventional compressor controlling method has a problem in that convergence of the evaporator temperature and response properties to the user's manipulation of the air conditioner are deteriorated.

SUMMARY OF THE INVENTION

Accordingly, to solve the above mentioned problems occurring in the prior art, and it is an object of the present invention to provide a method for controlling a variable capacity compressor of an air conditioner, which prevents excessive overshoot or undershoot of evaporator temperature by changing the maximum value of a slew rate to rapidly remove disturbance when set temperature inputted by a user or blower voltage is suddenly changed, thereby improving convergence and response properties of evaporator temperature.

To accomplish the above objects, according to an embodiment of the present invention, there is provided a method for controlling a variable capacity compressor of an air conditioner comprising the steps of: setting a target indoor temperature of a car by a user; sensing and inputting car indoor temperature, car outdoor temperature and solar radiation using sensors mounted at predetermined positions of the car; calculating a target discharge temperature of a vent using data of the target indoor temperature, the car indoor temperature, the car outdoor temperature and the solar radiation; calculating a target evaporator temperature and blower voltage according to the target discharge temperature; calculating a control duty according to the target evaporator temperature; calculating a target evaporator temperature change rate and a blower voltage change rate; determining whether or not it comes under a sudden variable condition through the control duty, the target evaporator temperature change rate and the blower voltage change rate; and setting the maximum value of the control duty change rate to an accelerative slew rate (Sc) greater than a basic slew rate (S0) when the sudden variable condition is determined, but setting the maximum value of the control duty change rate to the basic slew rate (S0) when it does not come under the sudden variable condition.

Furthermore, the sudden variable condition satisfies one of conditions that the control duty reaches the maximum value or the minimum value, that the target evaporator temperature change rate is more than a predetermined value (a) and that the blower voltage change rate is more than a predetermined value (b).

Moreover, the method for controlling the variable capacity compressor further includes the step of returning to the step of calculating the control duty after setting blower voltage when the user changes the stage of a blower.

In addition, the accelerative slew rate (Sc) satisfies the following formula, 40%/min.Itoreq.Sc.Itoreq.60%/min.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 4:
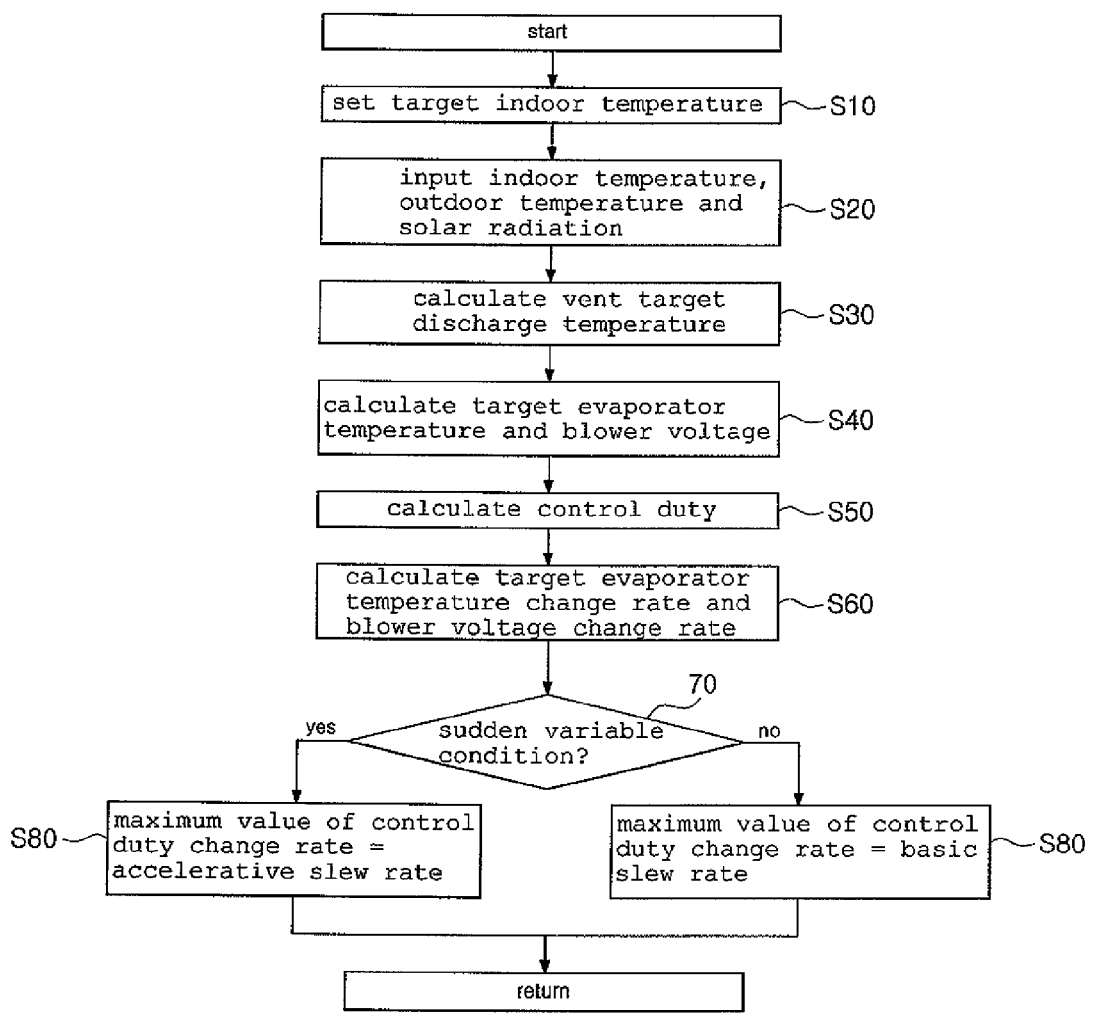
FIG. 4 is a flow chart showing a method for controlling a variable capacity compressor of an air conditioner according to an embodiment of the present invention.
Figure 5:
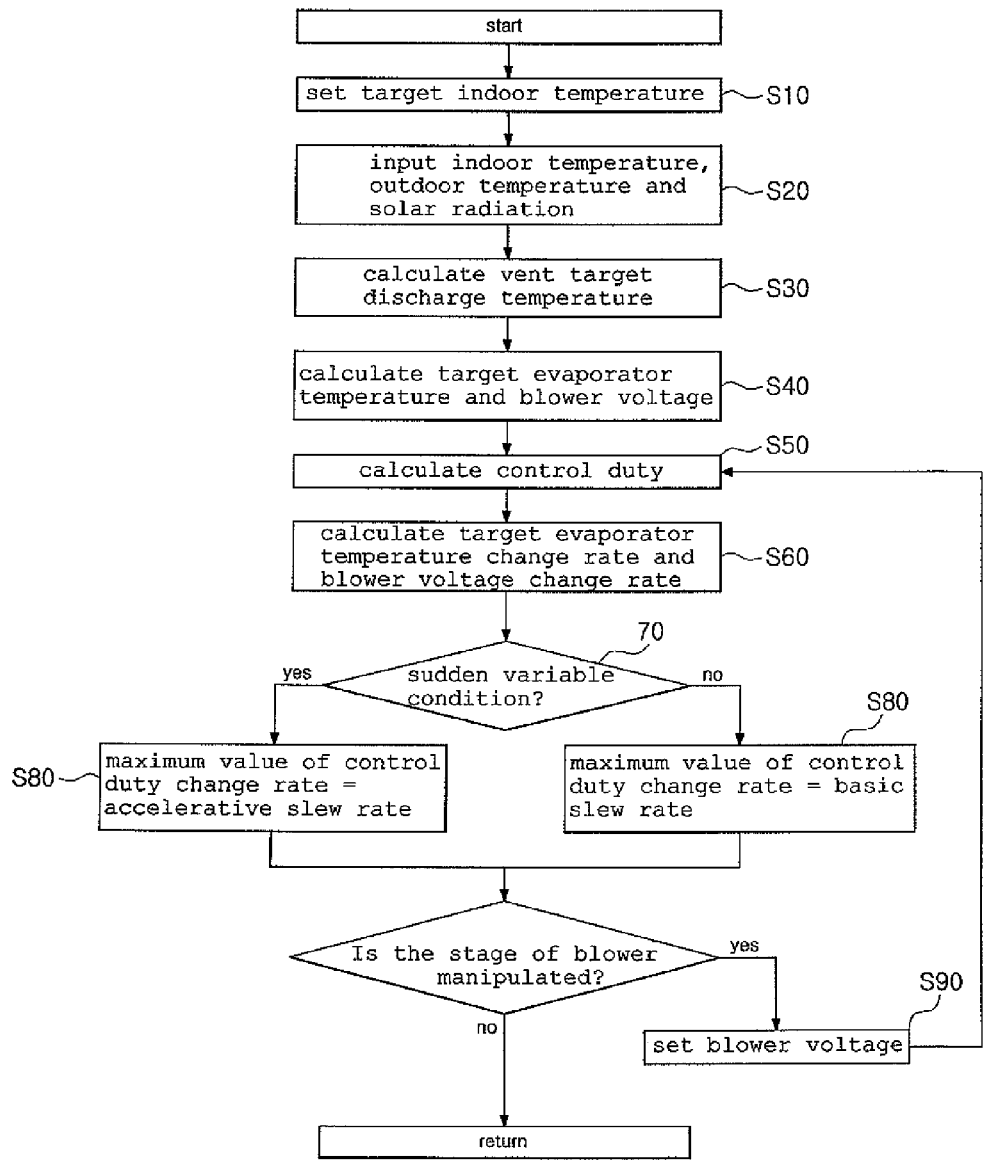
FIG. 5 is a flow chart showing a method for controlling a variable capacity compressor of an air conditioner according to another embodiment of the present invention.
Figure 6:
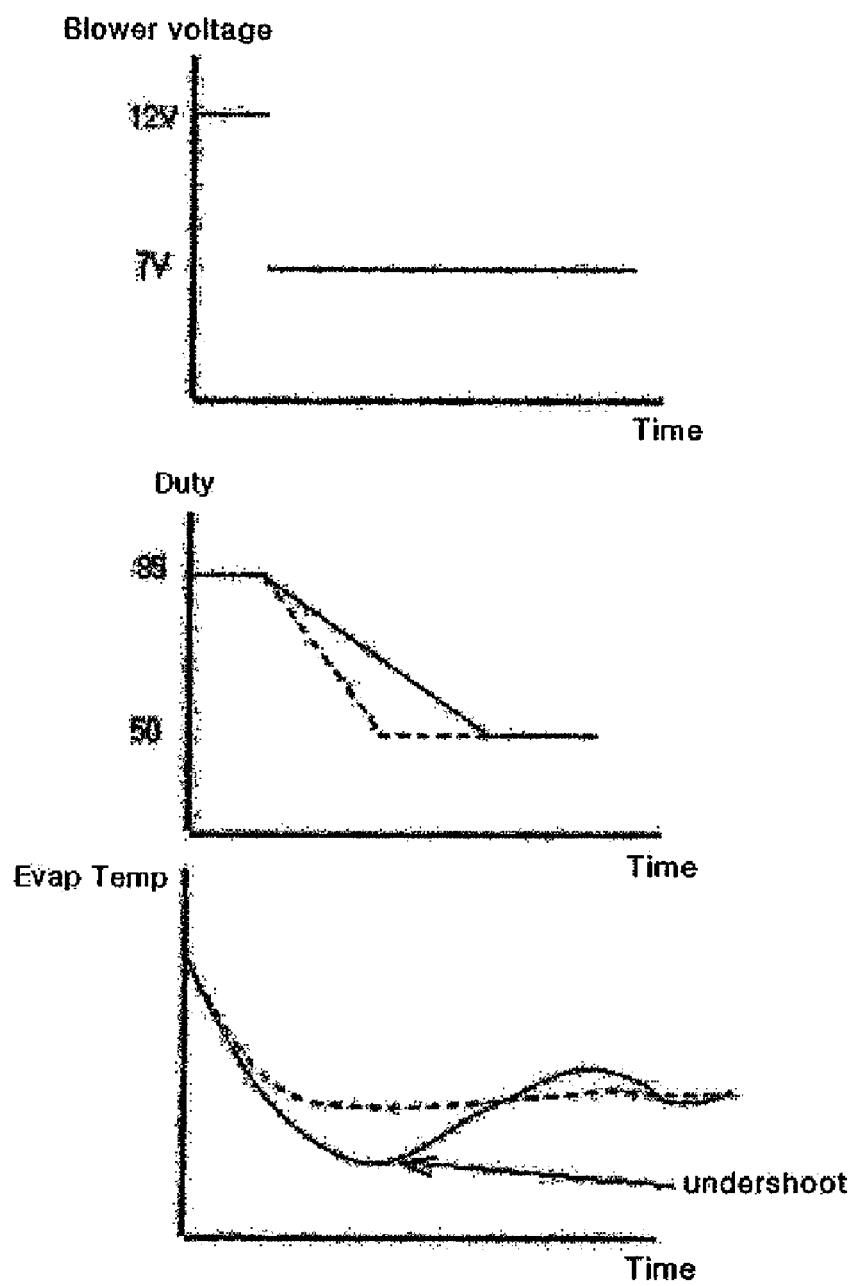
FIG. 6 is a graph for comparing changes in evaporator temperature generated when the maximum value of a control duty change rate is controlled by the basic slew rate (S0) and when it is controlled by an accelerative slew rate (Sc) in case that blower voltage is suddenly changed from 12V to 7V.
Figure 7:
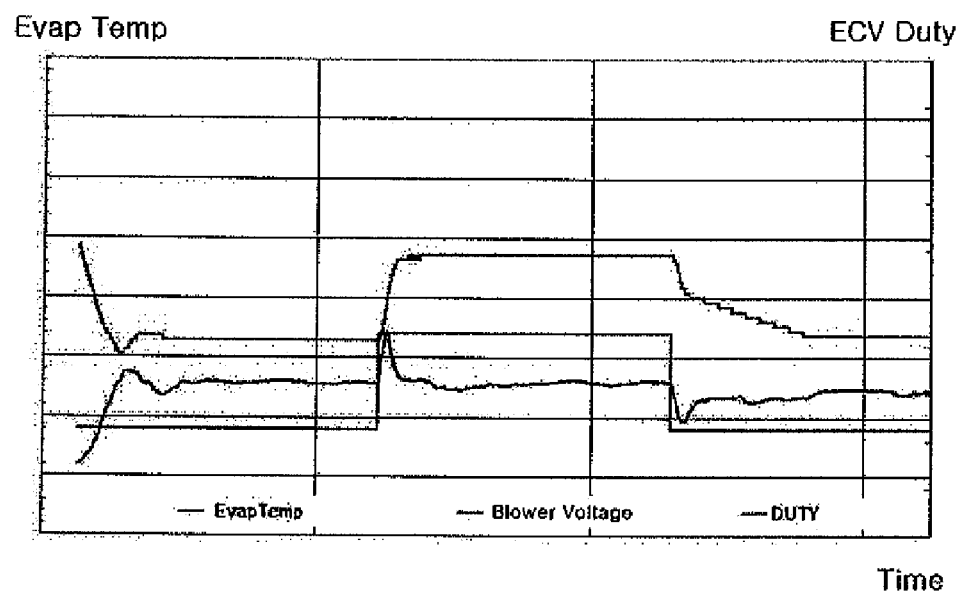
FIG. 7 is a graph showing a change in evaporator temperature when the maximum value of the control duty change rate is controlled by the accelerative slew rate (Sc) in case that blower voltage is suddenly changed from 4V to 12V and from 12V to 4V.

FIGS. 4 and 5 are flow charts of a method of controlling a variable capacity compressor of an air conditioner according to different embodiments of the present invention, FIG. 6 is a graph for comparing changes in evaporator temperature generated when the maximum value of a control duty change rate is controlled by the basic slew rate (S0) and when it is controlled by an accelerative slew rate (Sc) in case that blower voltage is suddenly changed from 12V to 7V, and FIG. 7 is a graph of a change in evaporator temperature when the maximum value of the control duty change rate is controlled by the accelerative slew rate (Sc) in case that blower voltage is suddenly changed from 4V to 12V and from 12V to 4V.

As shown in FIG. 4, the method for controlling the variable capacity compressor of the air conditioner according to an embodiment of the present invention includes the steps of: setting a target indoor temperature of a car by a user (S10); sensing and inputting car indoor temperature, car outdoor temperature and solar radiation using sensors mounted at predetermined positions of the car (S20); calculating a target discharge temperature of a vent using data of the target indoor temperature, the car indoor temperature, the car outdoor temperature and the solar radiation (S30); calculating a target evaporator temperature and blower voltage according to the target discharge temperature (S40); calculating a control duty according to the target evaporator temperature; calculating a target evaporator temperature change rate and a blower voltage change rate (S60); determining whether or not it comes under a sudden variable condition through the control duty, the target evaporator temperature change rate and the blower voltage change rate (S70); and setting the maximum value of the control duty change rate to an accelerative slew rate (Sc) greater than a basic slew rate (S0) when the sudden variable condition is determined, but setting the maximum value of the control duty change rate to the basic slew rate (S0) when it does not come under the sudden variable condition.

As shown in FIG. 5, if the user changes the stage of a blower, the controlling method may further include the step of returning to the step of calculating the control duty after setting blower voltage (S90).

Here, the sudden variable condition means to satisfy one of conditions that the control duty reaches the maximum value or the minimum value, that the target evaporator temperature change rate is more than a predetermined value (a) and that the blower voltage change rate is more than a predetermined value (b).

In this instance, the predetermined value (a) in the target evaporator temperature change rate satisfies the following formula, 3.degree. C.Itoreq.|a|.Itoreq.7.degree. C., and the predetermined value (b) in the blower voltage change rate satisfies the following formula, 3V.Itoreq.|b|.Itoreq.7V. In addition, the accelerative slew rate (Sc) satisfies the following formula, 40%/min.Itoreq.Sc.Itoreq.60%/min.

Meanwhile, FIG. 6 shows changes in blower voltage, control duty, and evaporator temperature according to the maximum value of the control duty change rate in a state where the target duty is the greatest when the blower voltage is high or the outdoor temperature is very high. In FIG. 6, a solid line shows a case that the maximum value of the control duty change rate is controlled by the basic slew rate (S0), and a dotted line shows a case that the maximum value of the control duty change rate is controlled by the accelerative slew rate (Sc).

In general, when the blower voltage is high or the outdoor temperature is very high, the evaporator does not perform a sufficient heat exchange. Therefore, even though the air conditioner is calculated, it is difficult to reach the target evaporator temperature, and the target duty is set to the maximum value since the evaporator temperature measured by the evaporator temperature sensor is high.

In the above state, when the blower voltage is reduced from 12V to 7V, the stage of the blower drops so as to perform the sufficient heat exchange. So, the evaporator temperature measured by the evaporator temperature sensor drops, and the target duty is calculated with a low value.

Here, when the maximum value of the duty change rate is controlled by the basic slew rate (S0), undershoot is generated. The basic slew rate (S0) is a duty change rate set to minimize a pulsation of a refrigerant flow according to a change of refrigerant introduced into the compressor and to minimize hunting of the compressor, and is set by 20%/min.

On the other hand, if the maximum value of the duty change rate is controlled by the accelerative slew rate (Sc), undershoot is not generated and a stable evaporator temperature can be obtained. Here, the accelerative slew rate (Sc) is set by 50%/min.

The method for controlling the variable for the air conditioner according to embodiments of the present invention provides a good response property according to the control of the air conditioner by changing the duty change rate.

First, sensor values of an evaporator temperature sensor 320, an outdoor temperature sensor 330, an indoor temperature sensor 340, a solar radiation sensor 350, a cooling water temperature sensor 360, and so on are inputted to a control unit 300, and then, set temperature and blower voltage set by the user are inputted to the control unit 300. According to cars, there is a difference in blower voltage, but most of the cars provide the lowest stage of about 3V and the highest stage of about 12V.

The target evaporator temperature is calculated by the set temperature of the car inputted by the user, the car indoor temperature, the car outdoor temperature and the solar radiation sensed and inputted by the sensors 330, 340 and 350. When the target evaporator temperature is calculated, the target duty of the ECV is calculated by the current evaporator temperature and the target evaporator temperature.

When the target duty is calculated, the control duty change rate is set after determining whether or not it comes under the sudden variable condition. That is, if the target evaporator temperature change rate is more than the predetermined value (a), if the blower voltage change rate is more than the predetermined value (b), or if the duty is the maximum value or the minimum value, the control duty change rate is set to the accelerative slew rate (Sc) greater than the basic slew rate (S0) set to prevent the pulsation of the refrigerant flow. Of course, if it does not come under the sudden variable condition, the maximum value of the control duty change rate is set to the basic slew rate (S0). When the control duty change rate is determined, the duty is changed from the current duty toward the target duty.

Even though the blower voltage is changed greatly, the target evaporator temperature is change greatly, or the duty reaches the maximum value or the minimum value, when the maximum value of the control duty change rate is set to the basic slew rate (S0), excessive overshoot or undershoot in the evaporator temperature may be generated while the duty is changed to the target duty. On the other hand, when the maximum value of the control duty change rate is controlled by the accelerative slew rate (Sc), a stable target evaporator temperature can be achieved.

Figure 1:
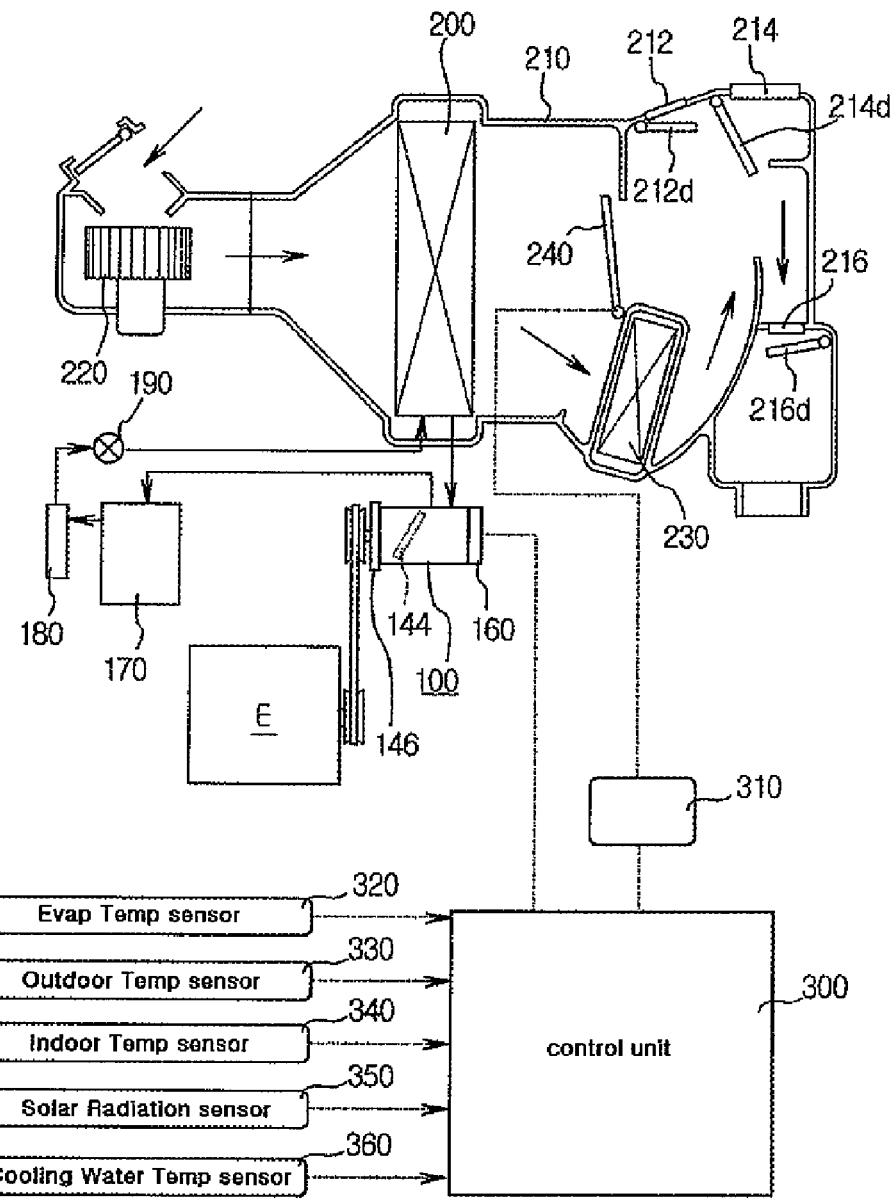
FIG. 1 is a structural view of an air conditioner to which a variable capacity compressor is applied.
Figure 2:
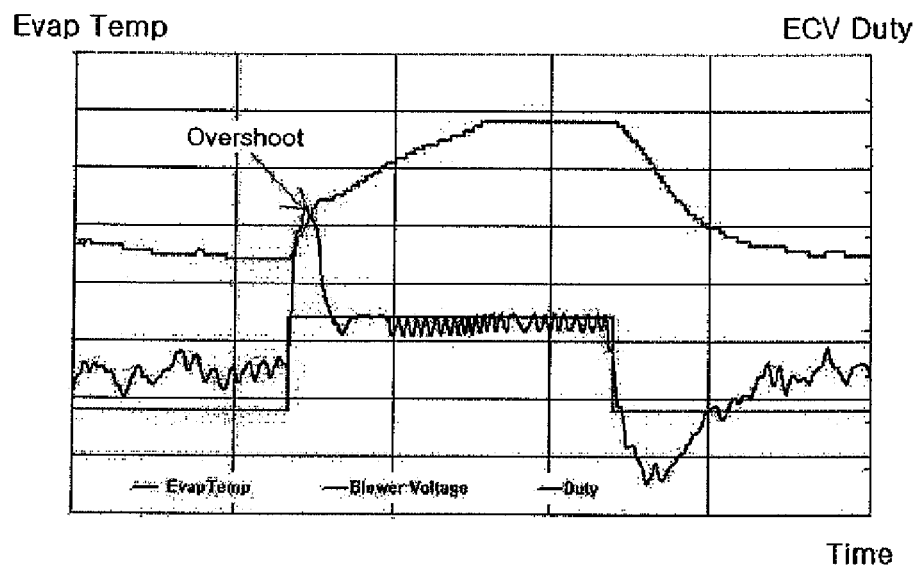
FIG. 2 is a graph showing a change in evaporator temperature when the maximum value of a slew rate is set to a basic slew rate (S0) to change a duty in case that blower voltage is suddenly changed from 4V to 12V and from 12V to 4V, in a conventional method for controlling a variable capacity compressor of an air conditioner.
Figure 3:
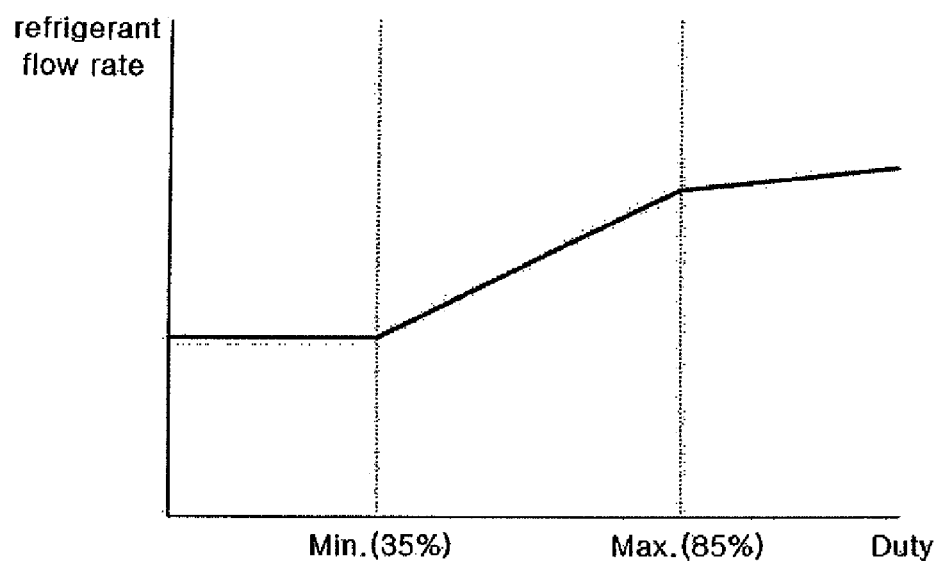
FIG. 3 is a graph showing a refrigerant flow rate according to a duty change of the variable capacity compressor.

That is, as shown in FIG. 2, if the blower voltage is suddenly changed from 4V to 12V or from 12V to 4V, when the maximum value of the control duty change rate is controlled by the basic slew rate (Sc) to change the duty, excessive overshoot or undershoot in evaporator temperature may be generated.

On the other hand, as shown in FIG. 7, if the maximum value of the control duty change rate is controlled by the accelerative slew rate (Sc), excessive overshoot or undershoot in evaporator temperature is not generated while the duty is changed, and so, more stable evaporator temperature can be obtained.

Meanwhile, when the user changes the stage of the blower, the control duty is calculated again after blower voltage is set. Therefore, air conditioning can be controlled according to the user's manipulation.

Here, the maximum value of the control duty means a value that changes little the flow rate of refrigerant even though the duty is increased, and the minimum value of the control duty means a value, which changes little the flow rate of refrigerant even though the duty is decreased. As described above, when the slew rate is determined, the duty is changed in such a way that the control duty change rate does not exceed the maximum value of the set slew rate so as to control to the target duty.

As described above, when the user suddenly changes blower voltage, when the air conditioning environment, for example, the set temperature, is suddenly changed, or when the duty of the ECV reaches the maximum value or the minimum value, the method for controlling the variable capacity compressor for the air conditioner according to embodiments of the present invention controls the maximum value of the duty change rate of the ECV with the accelerative slew rate greater than the basic slew rate to prevent pulsation of the refrigerant flow, hunting of the compressor, and the excessive overshoot or undershoot, thereby improving convergence and response properties of temperature.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A method of controlling an electronic control valve that controls discharge volume of a variable capacity compressor of an air conditioner of an automotive vehicle comprising the steps of: setting a target indoor temperature of the vehicle by an operator; sensing and inputting car indoor temperature of the vehicle, outdoor temperature and solar radiation of the region where the vehicle is located by using sensors mounted at predetermined positions of the vehicle; calculating a target discharge temperature of air processed by the air conditioner and flowing through a vent of the air conditioner using data indicative of the target indoor temperature, the sensed indoor temperature, the sensed outdoor temperature and the sensed solar radiation; calculating a target evaporator temperature and blower voltage according to the calculated target discharge temperature; calculating a control duty according to the calculated target evaporator temperature; calculating a target evaporator temperature change rate and a blower voltage change rate; determining whether or not the compressor experiences a sudden variable condition in response to the control duty, the target evaporator temperature change rate and the blower voltage change rate; and setting the maximum value of the control duty change rate to an accelerative slew rate greater than a basic slew rate in response to the sudden variable condition being determined, but setting the maximum value of the control duty change rate to a basic slew rate in response to no sudden variable condition being determined.

2. The method of controlling a variable capacity compressor according to claim 1, wherein the sudden variable condition satisfies at least one of the following conditions that the control duty reaches its maximum value or its minimum value, that the target evaporator temperature change rate is more than a predetermined value (a) and that the blower voltage change rate is more than a predetermined value (b).

3. The method of controlling a variable capacity compressor according to claim 2, wherein the predetermined value (a) in the target evaporator temperature change rate satisfies the following formula, $$3°C. \leq |a| \leq 7°C.$$

4. The method of controlling a variable capacity compressor according to claim 2, wherein the predetermined value (b) in the blower voltage change rate satisfies the following formula, $$3V \leq |b| \leq 7V.$$

5. The method of controlling a variable capacity compressor according to claim 1, further comprising the step of returning to the step of calculating the control duty after setting blower voltage when the user changes the stage of a blower.

6. The method of controlling a variable capacity compressor according to claim 1, wherein the accelerative slew rate satisfies the following formula, $$40\%/min. \leq Sc \leq 60\%/min.$$

7. The method of claim 1 further including controlling the compressor by controlling the maximum value of the duty change rate of the electronic control valve when the accelerative slew rate exceeds the basic slew rate to prevent pulsation of refrigerant flow, hunting of the compressor and excessive temperature overshoot or undershoot.

* * * * *